United States Patent [19]

Piret et al.

[11] 4,260,588

[45] Apr. 7, 1981

[54] PRODUCTION OF SULPHIDIC COPPER CONCENTRATES

[75] Inventors: Norbert L. Piret; Meinolf Höpper; Herbert Kudelka, all of Duisburg, Fed. Rep. of Germany

[73] Assignee: Duisburger Dupferhutte, Duisburg, Fed. Rep. of Germany

[21] Appl. No.: 74,042

[22] Filed: Sep. 10, 1979

[30] Foreign Application Priority Data

Sep. 16, 1978 [DE] Fed. Rep. of Germany ....... 2840424

[51] Int. Cl.³ ..................... C01G 3/12; C01G 51/08; C01G 53/08; C01G 9/04
[52] U.S. Cl. ..................... 423/37; 423/22; 423/39; 423/48; 423/99; 423/100; 423/109; 423/150
[58] Field of Search ................. 423/37, 38, 39, 48, 423/109, 100, 150, 35; 204/107, 113, 118; 75/117

[56] References Cited

U.S. PATENT DOCUMENTS

| | | |
|---|---|---|
| 1,588,806 | 6/1926 | Pike ........................................ 423/38 |
| 3,655,538 | 4/1972 | Renken .................................. 423/37 |
| 3,674,424 | 7/1972 | Stanley ................................. 423/150 |
| 3,776,826 | 12/1973 | Atadan ................................ 204/107 |
| 3,785,944 | 1/1974 | Atwood ................................ 423/38 |
| 3,957,602 | 5/1976 | Johnson ................................ 423/37 |
| 3,998,628 | 12/1976 | Gandon ................................ 423/40 |
| 4,023,964 | 5/1977 | DeMarthe .............................. 423/38 |

FOREIGN PATENT DOCUMENTS

| | | | |
|---|---|---|---|
| 2617348 | 9/1977 | Fed. Rep. of Germany ............ | 423/38 |
| 1502404 | 3/1978 | United Kingdom ...................... | 423/38 |

*Primary Examiner*—Brian E. Hearn
*Attorney, Agent, or Firm*—Sprung, Felfe, Horn, Lynch & Kramer

[57] ABSTRACT

A process for the production of a sulphidic copper concentrate from a complex sulphidic concentrate containing as its main constituents copper, iron and at least one non-ferrous metal selected from the group consisting of zinc, lead, nickel and cobalt, comprising mixing the complex sulphidic concentrate with a copper-containing predominantly chloridic solution thereby to form a suspension, and treating the suspension thus obtained at elevated temperature and pressure at a pH-value of below 3, thereby to form a sulphidic copper concentrate, thereby the non-ferrous metals being extracted from the concentrate without formation of significant amount of acid. Precious metals may also be present. Advantageously the ratio by weight of the complex concentrate added to the copper-containing predominantly chloridic solution to the copper content of the solution is such that the predominantly chloridic solution after being at least partly freed from copper by an exchange reaction has a potential at 60° C. of at least about 400 mV versus the standard hydrogen electrode.

9 Claims, 6 Drawing Figures

PRODUCTION OF SULPHIDIC COPPER CONCENTRATES

The present invention relates to a process for the production of sulphidic copper concentrates from complex sulphidic concentrates which, in addition to copper, iron and, optionally, precious metals, contain at least one of the non-ferrous metals selected from zinc, lead, nickel and cobalt as its main constituent. There is no significant acid formation in the process of the present invention. Generally the complex concentrates to be treated by this process additionally contain silver and gold and often comprise small quantities of cadmium, arsenic, antimony, mercury and/or bismuth.

Complex concentrates can be worked up by any one of a number of processes in which the metallurgical extraction, separation, and subsequent recovery of copper, and zinc, lead, nickel and/or cobalt, if present are carried out either pyrometallurgically or hydrometallurgically.

Thus, it is known that complex copper-zinc concentrates can be worked up in a conventional copper smelter. In such a case, the zinc content of the concentrate is transferred to the slag which accumulates (see for example Journal of Metals, 1955, pages 877 to 884; Engineering and Mining Journal Vol. 158, No. 6, pages 82 to 88). In a variation, the complex concentrates are smelted in an electric furnace after preliminary partial roasting (see for example Erzmetall, Vol. 4, 1951, pages 412 to 418; Erzmetall, Vol. 22, 1969, No. 3, pages 123 to 131). In both cases, the zinc is recovered from the obtained slag by treating the molten slag under strongly reducing conditions, the zinc and any lead present being obtained in the form of a fumed mixed oxide. The reduction of the slags is extremely expensive due to the high fuel demand thereof. In addition, working up of the fume is complicated because of accompanying impurities.

In the process according to German Offenlegungsschrift No. 2,617,348, digestion is carried out hydrometallurgically by oxidative leaching with copper (II) chloride in a chloridic system. In this case, copper, zinc, lead and some of the iron and silver pass into solution. The copper and zinc are extracted from the chloridic solution by means of ion exchangers, accompanied by oxidation of the copper (I) chloride present in the solution. The copper and the zinc can then be electrolytically recovered. In this particular process, the precious metals gold, and some of the silver remain in the leaching residue containing elemental sulphur. The necessary air oxidation during contacting of the aqueous and organic phases for extracting the copper gives rise to considerable losses of diluents from the organic phase.

The present invention provides a process for the production of sulphidic copper concentrates from complex sulphidic concentrates which, in addition to copper, iron and, optionally, precious metals contain at least one of the non-ferrous metals selected from zinc, lead, nickel and cobalt as their main constituent, characterized in that the complex sulphidic concentrates are added to and mixed with a copper-containing, predominantly chloridic solution and the suspension thus obtained is treated at elevated temperature and pressure at a pH-value of below about 3.

In the process of the present invention, the copper-containing chloridic solution may contain copper (I) and/or copper (II). In the process of the present invention, the copper present in the complex sulphidic concentrates (hereinafter referred to as complex concentrates) is recovered together with the sulphur and the noble metals present, if any, in the form of a copper concentrate, and more particularly in the form of a concentrate suitable for working up by a pyrometallurgical process. The accompanying non-ferrous metals zinc, lead, nickel and/or cobalt, where they are present in the complex concentrate, are extracted by wet chemical methods. It is only the iron which is present in the form of pyrites ($FeS_2$) in the complex concentrate which remains behind with the copper in the concentrate in the process of the present invention, whereas iron bound in other minerals is largely extracted with the accompanying NF-metals by the process.

The process according to the present invention does not preclude the possibility of working up the copper concentrate produced thereby using wet chemical methods. For economic reasons, however, particularly if the copper concentrate produced is rich in precious metals, pyrometallurgical working up by the process of the present invention represents the most suitable method of recovering copper and precious metals from the copper concentrated produced.

In the process according to the present invention, the NF-metals present (i.e. zinc, lead, nickel and/or cobalt) are removed from the complex concentrate by a hydrometallurgical process while a copper concentrate optionally containing precious metals, which is particularly suitable for pyrometallurgical working up, is produced. The hydrometallurgical process for producing copper concentrates from complex concentrates comprises mixing the complex concentrates with a copper-containing, predominantly chloridic solution. The suspension thus obtained is then treated at elevated temperature and pressure at a pH-value below 3 until the NF-metals present in the concentrate (i.e. zinc, lead, nickel and cobalt) have largely been removed from the complex concentrate with simultaneous, and at least partial, removal of copper from the predominantly chloridic solution by means of an exchange reaction between these NF-metals and the copper present in the solution in the absence of any significant acid formation. The precious metal-containing copper concentrate which accumulates is separated off from the fully reacted suspension, preferably by using a solid-liquid separation, while the NF-metal-containing solution at least partly freed from copper, which is produced, is preferably worked up by a hydrometallurgical method in order to separate and recover the NF-metals present.

The complex concentrates to be worked up by the process according to the present invention generally originate from a conventional flotation plant for primary ore dressing. Accordingly, the complex concentrates have a particle size distribution which corresponds to the conditions of the proposed hydrometallurgical stage of the process according to the present invention. Mineralogically, complex concentrates consist, in addition to gangue, of sulphidic minerals containing copper, iron, precious metals and at least one of the NF-metals zinc, lead, nickel and cobalt. Important minerals are, for example, chalcopyrite, bornite, covellite, chalcocite, sphalerite, marmatite, gelenite, pentlandite, millerite, heazlewoodite, carrollite, pyrites, marcasite and pyrrhotite.

In the process according to the present invention, complex concentrates are added to and mixed with a copper-containing, predominantly chloridic solution. In the context of the present invention, a predominantly chloridic solution is one which contains chloride in at least that quantity which maintains the redox system $Cu^{2+}/Cu^{+}$. In borderline cases, the predominantly chloridic solution must still contain chloride in such a quantity that, corresponding to the solubility of copper (I) chloride at 25° C., the solution contains copper (I) in a concentration of at least about 1 g/l. The copper-containing, predominantly chloridic solution may contain the copper either in the form of divalent copper or in the form of monovalent copper or in any combination of these ions. In view of the fact that the solubility of CuCl is governed both by the chloride concentration and by the temperature, some of the copper present in the copper-containing, predominantly chloridic solution may be in the form of crystallized copper (I) chloride.

The suspension obtained is then heated to the required temperature and is kept at that temperature until the NF-metals zinc, lead, nickel and cobalt, if they are present in the complex concentrate, have largely been removed.

In the context of the present invention, the expression "have largely been removed" means that the residual contents, in the accumulating reaction product, of the NF-metals zinc, lead, nickel and cobalt, if they are present in the complex concentrate, are so low that, on the one hand, the presence of these residual contents does not adversely affect the following processing stage for recovering the copper and the precious metals while, on the other hand, the losses attributable to the presence of these residual contents during pyrometallurgical recovery of the copper are so small that the process does not suffer economically as a result.

In the case of zinc and lead, the residual contents in the copper concentrate produced should preferably be less than about 1%. The reacted suspension has a pH-value below about 3, preferably below about 2.5.

The pressure prevailing during the exchange state corresponds to at least that of the water vapor. pressure prevailing at the reaction temperature. In the presence of foreign gases, for example where an oxygen-containing gas is added, the pressure increases commensurately with the amount of foreign gas added. For example, where an oxygen-containing gas is added, the pressure increases by the amount in which the foreign gas is added.

Where a copper-containing, predominantly chloridic solution containing noble metals is used in the process of the present invention, the precious metals are advantageously extracted with the copper concentrate produced. The at least partial removal of copper from the copper-containing solution used for the exchange reaction is preferably carried out for the most part during the exchange reaction.

In one preferred embodiment of the process of the present invention, the ratio by weight of the complex concentrate added to the copper-containing, predominantly chloridic solution to the copper content of the solution is adjusted in such a way that the predominantly chloridic solution which is at least partly freed from copper by the exchange reaction has a potential at 60° C. of at least about 400 mV (as measured against the standard hydrogen electrode).

It is particularly preferred to carry out the process according to the present invention in such a way that virtually no acid is formed. This is achieved by adjusting the ratio of copper (II) to copper (I) in the copper-containing, predominantly chloridic solution used for the exchange reaction.

As aforementioned the copper-containing, predominantly chloridic solution may contain the copper either in the form of its monovalent ion or its divalent ion or in the form of a mixture of both ions. According to the present invention, the ratio of copper (II) to copper (I) in the copper-containing, predominantly chloridic solution used for the exchange reaction is adjusted in such a way that virtually no acid is formed due to secondary reactions involving the sulphur present. At around 200° C., the reaction velocity of these secondary reactions is low compared to that of the main exchange reactions. Accordingly, the exchange reaction in the process according to the present invention may be carried out either with a copper (II)-containing or with a copper (I)-containing, predominantly chloridic solution. The $Cu^{2+}/Cu^{+}$-ratio in the solution is thus adjusted in such a way that the copper in the copper concentrate is predominantly present in the form of copper (II) sulphide or copper (I) sulphide. In the production of a concentrate containing copper (I) sulphide from a chloridic solution containing copper (I) ions, the copper content of the copper concentrate is higher than in the production of a concentrate containing copper (II) sulphide from a chloridic solution containing copper (II) ions. The further processing of the copper concentrate may dictate the choice of the $Cu^{2+}/Cu^{+}$-ratio particularly with regard to the sulphur content of the copper concentrate.

The processing of copper concentrates by pyrometallurgical methods presupposes a minimum sulphur content in the concentrate, for example for autogenous melting. In addition to the copper sulphides, the copper concentrate produced may also contain, as sulphur carrier, the pyrites which remain inert during the exchange reaction. If the pyrites content of the complex concentrate is too low, it is not advisable so far as the pyrometallurgical further processing of the copper concentrate is concerned to carry out the exchange at a low $Cu^{2+}/Cu^{+}$-ratio because the sulphur content of the copper concentrate containing copper (I) sulphide produced in that case would be too low. Accordingly, the process according to the present invention also affords the advantage of extreme flexibility with regard to the further processing of the copper concentrate produced.

As can be seen from the examples summarized in Table 1, hereinbelow adjustments of the $Cu^{2+}/Cu^{+}$-ratio also affords considerable flexibility with regard to the copper demand for carrying out the exchange reactions of the process according to the present invention.

In test 1 carried out with a very high $Cu^{2+}/Cu^{+}$-ratio, 0.24 ton of $Cu^{2+}$ in solution are required per ton of complex concentrate. In contrast, 0.37 t of $Cu^{+}$ in solution are required in test 4 which was carried with very low $Cu^{2+}/Cu^{+}$-ratio.

At a temperature much above 200° C., for example at 250° C., the reaction velocity of the previously mentioned secondary reactions is not insignificant. In order to minimize acid formation, the $Cu^{2+}/Cu^{+}$-ratio used for the process according to the present invention is kept low. Tests 2 and 5 of Table 1 illustrate this effect. With a very high $Cu^{2+}/Cu^{+}$-ratio, acid formation at 250° C. amounts of 240 kg of $H_2SO_4$ per ton of concentrate whereas, with a very low $Cu^{2+}/Cu^{+}$-ratio, it only amounts to 90 kg of $H_2SO_4$ per ton of concentrate.

The $Cu^{2+}/Cu^+$-ratio in the copper-containing, predominantly chloridic solution is preferably monitored by potential measurements.

The $Cu^{2+}/Cu^+$-ratio is adjusted either by oxidation if the $Cu^{2+}/Cu^+$-ratio is lower than the ratio required for the exchange process, or by reduction if the $Cu^{2+}/Cu^+$-ratio is higher than is required.

Oxygen, an oxygen-containing gas or chlorine gas may be used as the oxidizing agent, acid being simultaneously added to adjust the pH-value if necessary. The oxidizing agent for increasing the $Cu^{2+}/Cu^+$-ratio in the predominantly chloridic solution is preferably added before the exchange stage, but it may even be added, for example, during the exchange stage.

For carrying out this particular variant, the addition of for example oxygen has to be monitored in order to obtain the desired oxidation of $Cu^+$ to $Cu^{2+}$ and not the unwanted oxidation of sulphide sulphur to sulphate sulphur. In this case, the pressure reactor also has to be designed in such a way that the oxygen partial pressure in the final stage of the exchange reaction is low enough to enable the chloridic solution to be largely freed from copper. This is possible for example if a plug-flow reactor or a tube reactor without stirring of the suspension is used as the pressure reactor.

Where the $Cu^{2+}/Cu^+$-ratio in the predominantly chloridic solution is too high, the reducing agents used are metal (O)-containing raw materials such as, for example, cement copper, zinc-containing cementates from the purification of electrolytes in the electrolytic recovery of zinc or ball mill dusts from brass processing.

It is also possible to use sulphide-containing raw materials for reducing $Cu^{2+}$ to $Cu^+$, such as for example sulphide-containing materials such as sulphide concentrates, and metallurgical intermediate products such as copper-iron matte.

The reducing agent when used in accordance with the present invention is preferably the copper concentrate containing copper (I) sulphide itself, originating from the exchange reaction.

Table 5 summarizes tests in which a copper concentrate containing copper (I) sulphide produced by the exchange process was used for reducing a predominantly chloridic solution containing copper (II) chloride. Depending upon the excess of concentrate added, from 40 to 30% of the sulphidic copper was leached and from 70 to 100% of the divalent copper present in the chloridic solution was reduced to monovalent copper. According to XRD analysis, the resulting copper concentrate obtained consisted mainly of covellite (CuS) with—depending on the excess of concentrate—unreacted digenite ($Cu_9S_5$).

The copper-containing, predominantly chloridic solution used for the exchange reaction may contain sulphate ions in a certain concentration. In this case, the solubility of the lead present is reduced and, the complexed lead present in the sulphidic concentrate remains behind in the accumulating sulphidic concentrate in the form of lead sulphate. The production of a copper concentrate from the lead-containing complex concentrate by the process according to the present invention requires an additional stage. For selectively extracting the lead, the sulphidic concentrate containing lead sulphate which accumulates is subjected, before working up to recover copper and optionally noble metals, to hot leaching under acid conditions in concentrated chloridic solution, preferentially in a brine solution, under non-oxidizing conditions. The selectrive extraction is preferably carried out at a pH-value of about 1.0 to 2.5, at a temperature of about 50° to 90° C. and under non oxidizing conditions to prevent the re-dissolution of copper and silver.

The dissolved lead may be precipitated from the chloridic solution in the form of lead carbonate, using for example soda or crystallized out as $PbCl_2$ and converted to Pb-metal according to known methods.

Table 6 summarizes the results of a test in which a complex Cu-Zn-Pb-concentrate is treated with a predominantly chloridic solution containing copper and sulphate for producing a copper concentrate. The copper concentrate containing lead sulphate which is leached in a hot common salt solution. 99% of the lead was extracted. In other known hydrometallurgical extraction processes, such as e.g. oxidative pressure leaching, the extraction of lead by means of a hot brine leach presents considerable difficulties on account of the presence of other less leachable lead compounds such as e.g. lead jarosite. The example of Table 6 shows that the extraction of lead from the copper concentrate produced by the process of the the invention is readily achievable.

The copper-containing, predominantly chloridic solution used in accordance with the present invention may be produced by oxidative leaching of the copper-containing sulphidic concentrates in a chloridic solution. The oxidizing agent used in this case is iron (III) chloride, copper (II) chloride, oxygen or an oxygen-containing gas or chlorine gas. The chloridic solution used for the exchange reaction is preferably produced by subjecting part of the copper concentrates produced during the pressure exchange to oxidative leaching in a chloridic solution. It is also possible to use for this purpose at least part of the NF-metal-containing chloridic solution which is at least partly freed from copper and which is generated during the exchange reaction. It is also possible, however, to use solutions originating from e.g. the treatment of pyrite cinders by chloridizing roasting or chloridizing volatization for the above purpose.

The exchange reaction between the non-ferrous metal zinc, lead, nickel and cobal present in the concentrate and the copper present in solution is carried out at an elevated temperature. The temperature selected is dependent upon the particle size of the concentrate. Where the usual flotation concentrates are used, a minimum temperature of approximately 180° C. is necessary. This temperature may be reduced to below about 130° C. if the concentrates to be used are subjected to fine grinding. The process according to the present invention is, however, preferably carried out at an elevated temperature in the range of from about 180° C. to 250° C. and, with particular preference, at an elevated temperature in the range of about 200° C. to 220° C. Under such conditions the reaction time elapsing till the non-ferrous metals present have largely been removed from the complex sulphidic concentrates is approximately 1 hour. However, this reaction time may, of course, be varied by adjusting the temperature. Thus, it may be reduced to approximately 15 minutes, for example, by increasing the reaction temperature from 200° C. to approximately 250° C. (see Table 3). In the process according to the present invention, the reaction time is preferably reduced by increasing the reaction temperature to such an extent that the exchange reaction may be carried out, for example, in a plug-flow reactor with no stirring of the suspension, for example in a tube reactor. However, it is also possible, for example, to use continuous multi-chamber stirred autoclaves or batch-type single-chamber autoclaves.

The copper concentrate optionally containing noble metals produced from the complex concentrate by the process according to the present invention may be worked up both by hydrometallurgical methods and by pyrometallurgical methods. The advantages afforded by pyrometallurgical working up have already been explained. The copper concentrates produced from complex concentrates by the process according to the present invention are basically fairly rich in copper and iron because they consist predominantly of either CuS or $Cu_2S$. Among the pyrometallurgical processes suitable for copper-rich concentrates, it is particularly preferred To use the known TBRC (Top Blown Rotary Coverter) process.

Copper concentrates otherwise largely free from other non-ferrous metals are produced from complex concentrates by the process according to the present invention. To this end, it is necessary for the copper-containing, predominantly chloridic solution available for the exchange reaction to contain an adequate amount of copper. The ratio between the unit weight of the complex concentrate mixed with the predominantly chloridic solution and the unit weight of the copper present in solution should not exceed a certain maximum value bacause otherwise the predominantly chloridic copper-containing solution would be completely freed from copper without the non-ferrous metals zinc, lead, nickel and cobalt being largely removed from the complex concentrate. This maximum value is determined by the composition of the concentrate, by the reaction temperature and by the valency of the copper present in the predominantly chloridic solution.

Depending upon the composition of the concentrate, the reaction temperature and the valency of the copper in the predominantly chloridic solution, the maximum value is that which gives a potential value of about 400 mV against the standard hydrogen electrode, as measured at 60° C., in the solution that is at least partly freed from copper after the exchange reaction. Under these conditions, a residual copper concentration of from about 0.5 to 1.0 g/l is still present in the predominantly chloridic solution after the exchange reaction.

Although the process according to the present invention affords the possibility of simultaneously separating the copper from the other non-ferrous metals present both in the predominantly chloridic solution and also in the complex concentrate, the presence of a certain final copper concentration in the predominantly chloridic solution after the exchange reaction may be desirable in certain cases. This is the case for example when the copper present in the form of the monovalent ion in the predominantly chloridic solution is intended to be used for the subsequent zinc recovery and iron removal stages.

In this case, the process is preferably carried out in such a way that this solution is only partly free from copper, i.e. still contains copper (I) chloride. In this case, zinc may be extracted by means of a selective cation exchanger accompanied by oxidation of the monovalent copper using an oxidizing gas. In this case, an oxygen-containing gas is used as the oxidizing gas. Where the process is carried out in this way, it is also possible to precipitate the iron which is leached during the exchange accompanied by oxidation with oxygen, the monovalent copper again being oxidized at the same time.

The influence of the quantitative ratio is illustrated by the results summarized in Table 4.

The precious metals silver and gold are soluble to a certain extent in chloridic solutions. In cases where a predominantly chloridic solution containing silver, or the type obtained for example after the copper (II) chloride or iron (III) chloride leaching of sulphidic concentrates, or containing silver and gold, such as for example a solution originating from the working up of pyrites cinders by chloridizing roasting and leaching, is treated by the process according to the present invention, the precious metal content of the solution is transferred together with the copper to the copper concentrate. The extent to which the solution is freed from silver is dependent upon the extent to which the solution has been freed from copper and consequently it is only where the chloridic solution has been completely freed from copper that it can also be completely freed from silver. For a residual copper concentration, after the pressure exchange, of from about 0.5 to 1.0 g/l, the final silver concentration amounts to between 5 and 10 mg/l. The examples summarized in Table 4 illustrate the behavior of silver during the exchange.

Surprisingly, virtually no acid is formed in the process according to the present invention. This is in complete contrast to known processes conducted e.g. in pure sulphate solutions. In the process according to the present invention, it is immaterial whether the starting material used is a completely oxidized solution containing copper (II) chloride or a completely reduced solution containing copper (I) chloride.

Secondary reactions comprising the reaction of sulphur with water and the accompanying release of hydrogen ions to form acid play only a very minor part. It has been found that the reaction velocity of this secondary acid-forming reaction is dependent upon temperature. With the process of the present invention, it is even possible to work at temperatures much above 200° C. although, in that case, the copper-containing chloridic solution must contain the copper in reduced form, i.e. in the form of copper (I) ions.

The process according to the present invention is preferably carried out at a temperature above about 180° C. because, below this temperature, the removal of the non-ferrous metals from conventional flotation concentrates is incomplete. The iron bound in the chalcopyrite ($CuFeS_2$) is hardly extracted at temperatures below 180° C. because, under these conditions, this mineral reacts only slowly in a copper-containing solution. At temperatures in the range of about 140° to 180° C., however, it is possible using the process according to the present invention to free a copper-containing solution from copper using a large excess of concentrate, as can be seen from the examples set out in Table 2b. In contrast, Table 2 a shows that, below 140° C., the velocity of the exchange reaction is so low that the solution cannot even be completely freed of copper itself. Table 2b also shows that the reaction velocity increases with increasing temperature.

BRIEF DESCRIPTION OF THE DRAWINGS

The invention will be described in greater detail with reference to the accompanying drawings wherein.

Figure 1:
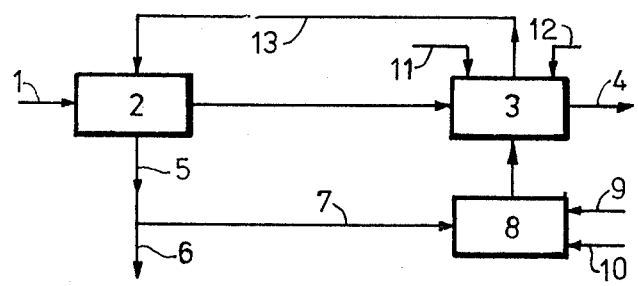
FIGS. 1–6 are flow sheets of different processes in accordance with the present invention.

Referring now more particularly to the drawings, the reference numerals used have the following meanings:

FIG. 1

1. Complex concentrate: $CuFeS_2$ (Zn,Fe)S, PbS, $FeS_2$, gangue, precious metals
2. Pressure exchange stage $$CuFeS_2 + CuCl_2 \rightarrow 2CuS\downarrow + FeCl_2$$

$$(Zn, Fe)S + CuCl_2 \rightarrow CuS\downarrow + (Zn,Fe)Cl_2$$

$$PbS + CuCl_2 \rightarrow CuS\downarrow + PbCl_2$$

3. Regeneration of the copper solution $$CuS + \tfrac{1}{2}O_2 + 2HCl \rightarrow CuCl_2 + S^o + H_2O$$

4. Copper concentrate: CuS, $FeS_2$, $S^o$, precious metals, gangue
5. $ZnCl_2$, $FeCl_2$, $PbCl_2$, NaCl-solution
6. Bleed-off to NF-metal separation and recovery $ZnCl_2$, $FeCl_2$, $PbCl_2$, NaCl-solution
7. Recirculation to the Generation of the copper solution
8. NaCl stirring
9. NaCl
10. $H_2O$
11. $O_2$
12. HCl
13. $CuCl_2$ solution
14. CuS-concentrate

FIG. 2

1. Complex concentrate: $CuFeS_2$ (Zn, Fe)S, PbS, $FeS_2$, gangue, precious metals
3. Regeneration of the copper solution $$CuS + \tfrac{1}{2}O_2 + 2HCl \rightarrow CuCl_2 + S^o\downarrow + H_2O$$

4. Copper concentrate: CuS, $FeS_2$, $S^o$, precious metals, gangue
5. $ZnCl_2$, $FeCl_2$, $PbCl_2$, NaCl solution
6. Bleed-off to NF metal separation and recovery $ZnCl_2$, $FeCl_2$, $PbCl_2$, NaCl solution
7. Recirculation to the Generation of the copper solution
8. NaCl stirring
9. NaCl
10. $H_2O$
11. $O_2$
12. HCl
13. $CuCl_2$ solution
15. Reduction stage:

$$CuCl_2 + Cu_2S \rightarrow CuS\downarrow + 2CuCl$$

16. CuCl solution
17. Pressure exchange stage $$CuFeS_2 + 2CuCl \rightarrow Cu_2S\downarrow + CuS\downarrow + FeCl_2$$

$$(Zn,Fe)S + 2CuCl \rightarrow Cu_2S\downarrow + (Zn,Fe)Cl_2$$

$$PbS + 2CuCl \rightarrow Cu_2S\downarrow + PbCl_2$$

18. $Cu_2S$ concentrate

FIG. 3

1. Complex concentrate: $CuFeS_2$ (Zn, Fe)S, PbS $FeS_2$, gangue, precious metals
4. Copper concentrate, CuS, $FeS_2$, $S^o$, gangue, precious metals
11. $O_2$-containing gas
13. $CuCl_2$ solution
19. $ZnCl_2$, $FeCl_2$, $PbCl_2$, NaCl solution CuCl excess
20. Cooling and $PbCl_2$ crystallization
21. $PbCl_2$ crystallization product to further treatment.
22. $ZnCl_2$, $FeCl_2$, NaCl solution, balance of $PbCl_2$, CuCl excess
23. Iron precipitation $$FeCl_2 + \tfrac{1}{2}O_2 + 2CuCl + \tfrac{1}{2}H_2O \rightarrow FeOOH\downarrow + 2CuCl_2$$

24. $CuCl_2$ solution with $ZnCl_2$, balance of $PbCl_2$
25. Iron precipitation product
26. Zinc extraction with cation exchanger $$ZnCl_2 + 2HR + CuCl + \tfrac{1}{2}O_2 \rightarrow ZnR + 2CuCl_2 + H_2O$$

27. $CuCl_2$ solution with $FeCl_2$, balance of $PbCl_2$
28. Zinc elution $$ZnR_2 + H_2SO_4 \rightarrow ZnSO_4 + 2HR$$

29. Zinc sulphate eluate
30. Aqueous $H_2SO_4$ solution
34. Pressure exchange stage $$CuFeS_2 + CuCl_2 \rightarrow CuS\downarrow + FeCl_2$$

$$(Zn,Fe)S + CuCl_2 \rightarrow CuS\downarrow + (Zn,Fe)Cl_2$$

$$PbS + CuCl_2 \rightarrow CuS\downarrow + PbCl_2$$

$$CuS + CuCl_2 \rightarrow 2CuCl + S^o\downarrow$$

FIG. 4

1. Complex concentrates: $CuFeS_2$, (Zn, Fe)S, PbS, $FeS_2$, gangue, precious metals
4. Copper concentrates: CuS, $FeS_2$, $S^o$, precious metals, gangue
11. $O_2$-containing gas
14. CuS-concentrate
15. Reduction stage $$Cu_2S + CuCl_2 \rightarrow 2CuCl + CuS\downarrow$$

16. CuCl solution
17. Pressure exchange stage $$CuFeS_2 + 2CuCl \rightarrow Cu_2S\downarrow + CuS\downarrow + FeCl_2$$

$$(Zn,Fe)S + 2CuCl \rightarrow Cu_2S\downarrow + (Zn,Fe)Cl_2$$

$$PbS + 2CuCl \rightarrow Cu_2S\downarrow + PbCl_2$$

18. $Cu_2S$ concentrate
19. $ZnCl_2$, $FeCl_2$, $PbCl_2$, NaCl solution, CuCl excess
20. Cooling and $PbCl_2$ crystallization
21. $PbCl_2$ crystallization product to further treatment
22. $ZnCl_2$, $FeCl_2$, NaCl, balance of $PbCl_2$, CuCl excess
23. Iron precipitation $$FeCl_2 + \tfrac{1}{2}O_2 + 2CuCl + \tfrac{1}{2}H_2O \rightarrow FeOOH\downarrow + 2CuCl_2$$

24. CuCl$_2$-solution with ZnCl$_2$, balance of PbCl$_2$
25. Iron precipitation product
26. Zinc extraction with cation exchanger $$ZnCl_2 + 2HR + 2CuCl + \tfrac{1}{2}O_2 \rightarrow ZnR_2 + 2CuCl_2 + H_2O$$

27. CuCl$_2$ solution with FeCl$_2$, balance of PbCl$_2$
28. Zinc elution:

$$ZnR_2 + H_2SO_4 \rightarrow ZnSO_4 + 2\,HR$$

29. Zinc sulphate eluate
30. Aqueous H$_2$SO$_4$ solution
31. CuCl$_2$—CuCl solution
32. CuCl$_2$-solution with balance of FeCl$_2$, ZnCl$_2$, PbCl$_2$
33. Oxidation stage $$CuCl_2 + CuS \rightarrow 2\,CuCl + S^o \downarrow$$

FIG. 5

1. Complex concentrate: CuFeS$_2$ (Zn, Fe)S, PbS, FeS$_2$ gangue, precious metals
4. Copper concentrate: CuS, FeS$_2$, S$^o$, gangue, precious metals
5. ZnCl$_2$, FeCl$_2$, PbCl$_2$; NaCl solution
10. H$_2$O
11. O$_2$
14. CuS concentrate
15. Reduction stage:

$$Cu_2S + CuCl_2 \rightarrow 2CuCl + CuS \downarrow$$

17. Pressure exchange stage $$CuFeS_2 + 2CuCl \rightarrow Cu_2S \downarrow + CuS \downarrow + FeCl_2$$

$$(Zn,Fe)S + 2CuCl \rightarrow Cu_2S \downarrow + (Zn,Fe)Cl_2$$

$$PbS + 2CuCl \rightarrow Cu_2S \downarrow + PbCl_2$$

18. Cu$_2$S concentrate
20. Cooling and PbCl$_2$ crystallization
21. PbCl$_2$ crystallization product to further treatment
35. CuCl—FeCl$_2$ solution
36. FeCl$_2$—, CuCl$_2$-solution
37. Oxidation stage $$2FeCl_3 + CuS \rightarrow 2FeCl_2 + CuCl_2 + S^o \downarrow$$

38. Zinc extraction with anion exchanger $$2RCl + ZnCl_2 \rightarrow R_2(ZnCl_4)$$

39. HCl raffinate
40. FeCl$_3$ solution
41. Fe-precipitation and Fe(III)-chloride regeneration $$3FeCl_2 + 3/2O_2 + \tfrac{1}{2}H_2O \rightarrow FeOOH \downarrow + 2FeCl_3$$

42. Elution $$R_2ZnCl_4 \rightarrow 2RCl + ZnCl_2$$

43. ZnCl$_2$ eluate
44. Zinc extraction $$2R'H + ZnCl_2 \rightarrow R_2'Zn + 2HCl$$

45. Elution $$R_2'Zn + H_2SO_4 \rightarrow 2R'H + ZnSO_4$$

46. H$_2$SO$_4$ from recovery of zinc by electroysis
47. ZnSO$_4$-solution for the recovery of zinc by electrolysis

FIG. 6

1. Complex concentrate: CuFeS$_2$ (Zn, Fe)S, PbS FeS$_2$, gangue, precious metals
4. Copper concentrate: CuS, S$^o$, FeS$_2$ precious metals, gangue
9. NaCl, NaCl-equalization
10. H$_2$O
11. O$_2$
13. CuCl$_2$ solution
30. H$_2$SO$_4$
48. Pressure exchange stage $$CuFeS_2 + CuCl_2 \rightarrow 2CuS \downarrow + FeCl_2$$

$$(Zn,Fe)S + CuCl_2 \rightarrow CuS \downarrow + (Zn,Fe)Cl_2$$

$$PbS + CuCl_2 \rightarrow CuS \downarrow + PbCl_2$$

$$PbCl_2 + Na_2SO_4 \rightarrow PbSO_4 \downarrow + 2NaCl$$

49. Regeneration of the copper solution $$CuS + \tfrac{1}{2}O_2 + 2NaCl + H_2SO_4 \rightarrow CuCl_2 + Na_2SO_4 + S^o \downarrow + H_2O$$

50. NaCl leaching under non-oxidizing conditions $$PbSO_4 + 2NaCl \rightarrow PbCl_2 + Na_2SO_4$$

51. CuS concentrate with PbSO$_4$ and S$^o$
52. Pb-containing NaCl solution
53. Na$_2$CO$_3$
54. PbCO$_3$-precipitation:

$$PbCl_2 + Na_2CO_3 \rightarrow 2NaCl + PbCO_3 \downarrow$$

55. PbCO$_3$
56. Bleed-off NaCl solution
57. ZnCl$_2$, FeCl$_2$, NaCl-solution Bleed-off to non-ferrous metal separation and recovery; ZnCl$_2$, FeCl$_2$, NaCl, Na$_2$SO$_4$-solution
58. Recirculation to the Generation of the CuCl$_2$ solution
59. ZnCl$_2$, FeCl$_2$, NaCl, Na$_2$SO$_4$-solution
60. CuS concentrate containing PbSO$_4$ The flow sheets for carrying out the pressure exchange process relate to the production of a copper-containing, predominantly chloridic solution and to the treatment of the generated iron-containing and NF-metal-containing chloridic solution for removing the iron and separating and recovering the NF-metals Zn, Pb, Ni and Co when they are present. Copper-containing predominantly chloridic solutions are generated in various extraction processes, for example in the oxidative leaching of copper concentrates or copper-containing complex concentrates using iron (III) chloride or copper (II) chloride. A sulphate-containing, predominantly chloridic solution is produced in the processing of pyrite cinders by chloridizing roasting or chloridizing volatization. In addition, copper-containing and sulphate-containing, predominantly chloridic solutions often accumulate in the working up of "recycling" materials.

The copper-containing, predominantly chloridic solutions produced in accordance with the above-mentioned examples are all suitable for carrying out the process according to the present invention. The process according to the present invention affords the additional advantage that a copper-containing, predominantly chloridic solution can readily be produced from the copper concentrate obtained in the pressure exchange process. This means that, where the process according to the present invention is used, there is no need for a separate, expensive extraction stage.

FIG. 1

The process illustrated in FIG. 1 comprises the following stages:

1. Pressure exchange stage using a $Cu^{2+}$-containing solution. The temperature is preferably 200° C. Production of a CuS concentrate.
2. Bleed off of part of the solution generated in the pressure exchange (copper content 1 g/l) for separating and recovering the NF metals and for removing iron.
3. Returning the rest of the solution generated in the pressure exchange (copper content 1 g/l) to production of the copper-containing chloridic solution. Addition of common salt and water to make up for Bleed-off losses.
4. Production of the copper (II)-containing, predominantly chloridic solution by partial oxidation of the copper (II) sulphide concentrate formed during the pressure exchange using an oxygen-containing gas.

Since acid is consumed during oxidation, acid has to be added, for example in the form of HCl or in the form of $H_2SO_4$ and NaCl.

The copper concentrate and the $CuCl_2$ solution required for the pressure exchange are recovered from the suspension by solid/liquid separation.

FIG. 2

Figure 2:
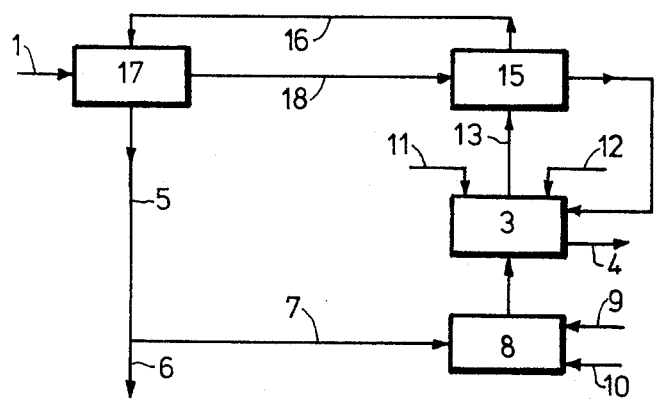

The process illustrated in FIG. 2 essentially comprises the same stage as the process illustrated in FIG. 1, the difference being that a $Cu^+$-containing solution is used for the pressure exchange stage. Accordingly, a CuCl solution has to be prepared.

The stages are as follows:

1. Pressure exchange stage using a $Cu^+$-containing solution. The temperature is 200°–250° C. production of a $Cu_2S$ concentrate.
2. Bleed-off of part of the solution generated in the pressure exchange (copper content 1 g/l) for separating and recovering the NF metals and for removing iron.
3. Returning the rest of the solution generated in the pressure exchange (copper content 1 g/l) to the production of the copper-containing chloridic solution. Addition of common salt and water to make up for bleed-off losses.
4. Production of the copper (II)-containing, predominantly chloridic solution by partial oxidation of the copper (II) sulphide concentrate emanating from the preceding reduction stage using an oxygen-containing gas.

Since acid is consumed during oxidation, acid has to be added, for example in the form of HCl or in the form of $H_2SO_4$ and NaCl. The copper concentrate and the $CuCl_2$ solution to be reduced are recovered from the suspension by solid/liquid separation.

5. The $CuCl_2$ solution is converted with the copper (I) sulphide concentrate, produced in the pressure exchange, into a CuCl solution suitable for the pressure exchange.

Figure 3:
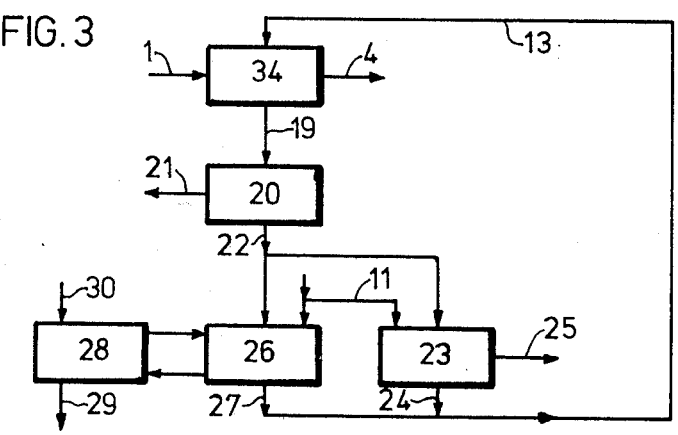
Figure 4:
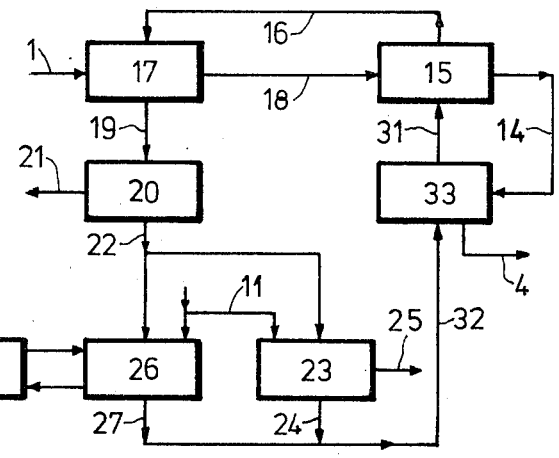
Figure 5:
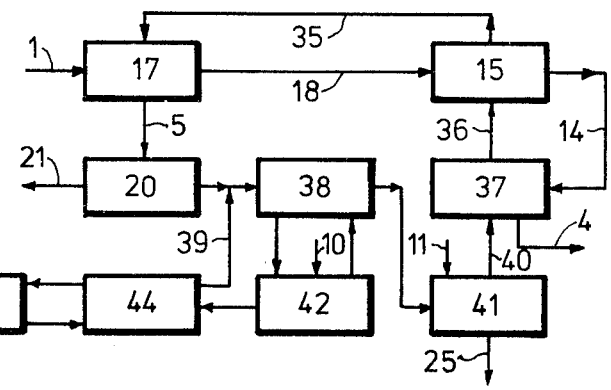

The flow sheets shown in FIGS. 3, 4 and 5 are based on the significant advantage afforded by the process according to the present invention, namely the absence of acid formation during the exchange stage. Accordingly, the pressure exchange process may be carried out in a closed circuit. This presupposes an additional step for removing the NF metals which may be carried out by known methods.

FIG. 3

1. Pressure exchange stage using a $Cu^{2+}$-containing solution. The temperature is preferably 200° C. and the concentrate to copper ratio is very low so that, on completion of the pressure exchange process, a solution accumulates which still contains enough monovalent copper to enable the iron and zinc to be removed. The copper (II) sulphide concentrate formed is separated off.
2. Partial removal of lead by cooling the solution generated during the pressure exchange and separating off the $PbCl_2$ which has crystallized out.
3. Extraction of the zinc from a first part of the solution containing $ZnCl_2$, $FeCl_2$, NaCl and CuCl using a cation exchanger, accompanied by oxidation of the CuCl to $CuCl_2$ using an oxygen-containing gas.
4. Precipitation of the iron in the form of iron oxide or iron hydroxide, accompanied by oxidation of the CuCl to $CuCl_2$.
5. Returning the copper (II) chloride solution to the pressure exchange stage.

FIG. 4

1. Pressure exchange stage using a $Cu^+$-containing solution. The temperature is 200°–250° C. The concentrate to copper ratio is very low so that, on completion of the pressure exchange process, a solution accumulates which still contains enough monovalent copper to enable the iron and zinc to be removed. The copper (I) sulphide formed is separated off.
2. Partial removal of lead by cooling the solution generated during pressure exchange and separating off the $PbCl_2$ which has crystallized out.
3. Extraction of the zinc as in the flow sheet shown in FIG. 3.
4. Precipitation of the iron as in the flow sheet shown in FIG. 3.
5. Enrichment of the copper-containing solution by partial oxidation of the CuS concentrate, produced in the reduction stage. Separation of the final copper concentrate.
6. Production of the CuCl solution by reduction of the solution originating from stage 5 with copper (I) sulphide concentrate produced in the pressure exchange.

Return of the CuCl solution to the pressure exchange process.

FIG. 5

1. Pressure exchange stage using a $Cu^+$-containing solution. The temperature is 200°–250° C. and the copper concentration of the solution after the exchange amounts to approximately 1 g/l.

2. Partial removal of lead by cooling the solution generated during the pressure exchange process and separating the $PbCl_2$ which has crystallized out.

3. Extraction of zinc in the form of $ZnCl_2$ using an anion exchanger. Subsequent conversion of the extracted $ZnCl_2$ into $ZnSO_4$ using a cation exchanger and recovery of HCl.

4. Precipitation of iron and regeneration of iron (III) chloride by oxidation of the $FeCl_2$ solution with oxygen.

5. Leaching of the copper (II) sulphide concentrate originating from the reduction stage with regenerated iron (III) chloride for producing the necessary copper (II) solution.

6. Reduction of the $CuCl_2$ solution originating in stage 5 with copper (I) sulphide concentrate produced in the pressure exchange process.

Return of the CuCl-containing solution to the pressure exchange process.

FIG. 6

Figure 6:
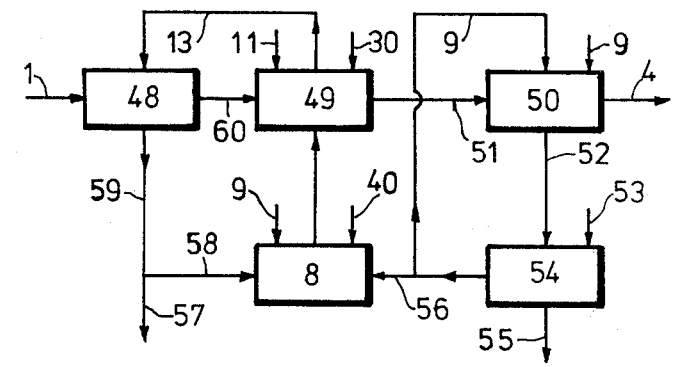

The flow sheet illustrated in FIG. 6 corresponds to that illustrated in FIG. 1, the only difference being that, in view of the high sulphate concentration in the predominantly chloridic solution, the lead present in the complex concentrate is extracted in the form of $PbSO_4$ with the copper concentrate. Accordingly, leaching with common salt as illustrated in FIG. 6 is necessary.

The process according to the invention is further illustrated by the following examples.

The stirring speed in the autoclaves amounted to 1000 r.p.m., the reaction temperature of the suspension was reached by resistance heating of the outer wall of the autoclave, and in order to be able to exactly determine the influence of residence time and temperature, the heating time was kept as short as possible.

The reaction temperature corresponded to the respective test conditions while the pressure in the autoclave corresponded to the water vapor pressure at the prevailing temperature.

On completion of a particular test, the fully reacted suspension was rapidly cooled using a water-cooled coil and then filtered. The filter cake was vacuum dried after washing.

The test conditions and test results of the individual groups of tests are set out in Tables 1 to 7 below.

TABLE 1

Pressure exchange in the predominantly chloridic system
Complex—Cu—Zn—Pb—concentrate Chemical composition

| | Cu | Zn | Pb | Fe | S |
|---|---|---|---|---|---|
| % | 16.4 | 10.0 | 6.3 | 25.3 | 35.2 |

Composition of the predominantly chloridic solution:
95 g/l Cl⁻, 145 g/l SO₄²⁻, 15-25 g/l Cu, 39.5 g/l Zn, 1.5 g/l Fe, cation equilization Na⁺

| Conditions | | | | Copper-containing solution | | | | | Solution freed from copper | | Copper Concentrate | | Composition | | | Removal of copper | Yield | | Acid Formation | | Mineralogical composition according to XRD analysis | | | XRD-Analysis | | | | |
|---|---|---|---|---|---|---|---|---|---|---|---|---|---|---|---|---|---|---|---|---|---|---|---|---|---|---|---|---|
| Test No. | Temp. (°C.) | Residence time (h) | Cu-Zn-conc. input (g/l) | Cu tot. (g/l) | Cu²⁺ (g/l) | Cu¹ (g/l) | H₂SO₄ (g/l) | Ratio of conc. (g/l) to Cu (g/l) | Cu (g/l) | H₂SO₄ (g/l) | Concentration (g/l) | Cu (%) | Zn (%) | Fe (%) | (%) | Zn (%) | Fe (%) | H₂SO₄ (g) | Conc. (g) | Cp | Sph | Py | Ga | Cov | Di | Py | An |
| 1 | 200 | 1 | 75 | 18.1 | 18.1 | 0 | 14.2 | 4.14 | 0.92 | 24.9 | 78.9 | 37.0 | 1.43 | 12.2 | 94.9 | 85.3 | 49.5 | 0.14 | | 4 | 4 | 3 | 2 | 4 | 2 | 3 | 2 |
| 2 | 250 | 1 | 45 | 15.2 | 15.2 | 0 | 16.2 | 2.96 | 0.04 | 27.2 | 52.2 | 46.3 | 0.44 | 9.05 | 99.5 | 95.0 | 58.8 | 0.24 | | 4 | 4 | 3 | 2 | 3 | 3 | 3 | 2 |
| 3 | 200 | 1 | 43.3 | 19.0 | 0 | 19.0 | 14.4 | 2.28 | 1.62 | 14.9 | 64.5 | 38.4 | 2.44 | 11.7 | 91.5 | 64.0 | 31.8 | 0 | | 4 | 4 | 3 | 2 | 2 | 4 | 3 | 2 |
| 4 | 200 | 3 | 48.5 | 18.1 | 0 | 18.1 | 13.3 | 2.68 | 0.43 | 14.3 | 68.4 | 39.5 | 1.61 | 11.0 | 97.6 | 77.3 | 39.8 | 0.02 | | 4 | 4 | 2 | 2 | 2 | 4 | 2 | 2 |
| 5 | 250 | 1 | 30 | 21.3 | 0 | 21.3 | 14.9 | 1.41 | 1.24 | 17.6 | 46.9 | 52.4 | 0.47 | 9.6 | 94.2 | 92.7 | 40.7 | 0.09 | | 4 | 4 | 3 | 2 | 0 | 4 | 2 | 2 |

0 : not detectable
2 : low
3 : medium
4 : high
Cov = covellite = CuS
Cp = chalcopyrite = CuFeS₂
Di = digenite = Cu₉S₅
Sph = sphalerite = ZnS
Py = pyrite = FeS₂
Ga = galena = PbS
An = anglesite = PbSO₄

TABLE 2

Dependence of pressure exchange upon temperature

Temperature range <140° C.

Input:
1 Cu—Zn—Pb concentrate

| | Cu | Zn | Fe | Pb | S |
|---|---|---|---|---|---|
| % | 11.3 | 12.0 | 25.1 | 4.6 | 33.3 |

2 Predominantly chloridic solution

| | $Cu^{2+}$ | Fe | Zn | $Cl^-$ | $SO_4^{2-}$ | $Na^+$ | |
|---|---|---|---|---|---|---|---|
| g/l | 15.3 | 1.5 | 39.5 | 95 | 145 | | Cation equalization |

Temperature range >140° C.

Input:
1 Cu—Zn—Pb concentrate

| | Cu | Zn | Fe | Pb | S |
|---|---|---|---|---|---|
| % | 16.4 | 10.0 | 25.3 | 6.3 | 35.2 |

2 Predominantly chloridic solution

| | $Cu^{2+}$ | Fe | Zn | $Cl^-$ | $SO_4^{2-}$ | $Na^+$ | |
|---|---|---|---|---|---|---|---|
| g/l | 15-25 | 1.5 | 39.5 | 95 | 145 | | cation |

| | Conditions | | | | | Copper Concentrate | | | | | |
|---|---|---|---|---|---|---|---|---|---|---|---|
| Test No. | Temp. (°C.) | Residence time (h) | Concentrate (g/l) | Ratio g concentrate g Cu in solution | Final Solution Cu (g/l) | Quantity (g/l) | Cu (%) | Zn (%) | Fe (%) | Cu-precipitation (%) | Zn yield (%) | Fe yield (%) |
| Temperature Range <140° C. | | | | | | Temperature Range <140° C. | | | | | | |
| 8 | 90 | 3 | 317 | 20.7 | 10.4 | 315 | 12.9 | 11.5 | 23.0 | 32.0 | 4.8 | 8.9 |
| 9 | 120 | 3 | 317 | 20.7 | 4.2 | 319.6 | 14.5 | 10.7 | 22.0 | 72.5 | 10.8 | 11.6 |
| 10 | 140 | 3 | 317 | 20.7 | 0.022 | 313.5 | 16.4 | 10.0 | 20.2 | 99.9 | 17.6 | 20.4 |
| Temperature Range >140° C. | | | | | | Temperature Range >140° C. | | | | | | |
| 11 | 140 | 1 | 317 | 20.7 | 0.01 | 316 | 21.2 | 6.9 | 21.7 | 99.9 | 31.2 | 14.5 |
| 12 | 150 | 3 | 350 | 14.0 | 0.83 | 347.5 | 23.5 | 6.4 | 6.8 | 96.7 | 36.5 | 73.3 |
| 13 | 180 | 1 | 69.5 | 4.54 | 2.1 | 78.8 | 33.2 | 2.31 | 16.2 | 86.3 | 73.8 | 27.4 |
| 14 | 200 | 1 | 75.0 | 4.14 | 0.92 | 78.9 | 37.0 | 1.45 | 12.2 | 94.9 | 85.0 | 49.3 |
| 15 | 220 | 1 | 69.5 | 4.54 | 0.16 | 71.6 | 59.1 | 1.22 | 12.4 | 99.0 | 87.4 | 49.5 |
| 16 | 250 | 1 | 45 | 2.90 | 0.04 | 52.2 | 46.3 | 0.44 | 9.05 | 99.7 | 94.9 | 58.5 |

TABLE 3

Dependence of pressure exchange upon residence time at 200° C. and 250° C.

Input: Cu—Zn—Pb-concentrate

| | Cu | Zn | Fe | Pb | S |
|---|---|---|---|---|---|
| % | 16.4 | 10.0 | 25.3 | 6.3 | 35.2 |

Predominantly chloridic solution

| | $Cu^{2+}$ | Fe | Zn | $Cl^-$ | $SO_4^{2-}$ | $Na^+$ | |
|---|---|---|---|---|---|---|---|
| g/l | 15-25 | 1.5 | 39.5 | 95 | 145 | | cation equalization |

| | Conditions | | | | | | Copper Concentrate | | | | | |
|---|---|---|---|---|---|---|---|---|---|---|---|---|
| Test No. | Temp. (°C.) | Residence Time h | Concentrate (g/l) | Ratio g concentrate g Cu in solution | Starting Solution Cu (g/l) | Final Solution Cu (g/l) | Quantity (g/l) | Cu (%) | Zn (%) | Fe (%) | Cu-Precipitation (%) | Zn yield (%) | Fe yield (%) |
| 18 | 250 | 1 | 45 | 2.96 | 15.2 | 0.04 | 52.2 | 46.3 | 0.44 | 9.05 | 99.5 | 95 | 58.8 |
| 19 | 250 | 0.5 | 30 | 1.97 | 15.2 | 2.60 | 41.9 | 44.7 | 0.36 | 9.80 | 82.9 | 95 | 45.9 |
| 20 | 250 | 0.25 | 50 | 3.29 | 15.2 | 0.22 | 56.9 | 43.1 | 0.93 | 9.70 | 98.6 | 89.4 | 56.4 |
| 21 | 200 | 3 | 65 | 4.25 | 15.3 | 0.19 | 68.0 | 40.4 | 0.89 | 10.8 | 98.8 | 90.7 | 55.3 |
| 22 | 200 | 2 | 65 | 4.25 | 15.3 | 0.28 | 66.1 | 40.8 | 0.78 | 10.8 | 98.2 | 92.1 | 56.6 |
| 23 | 200 | 1 | 75 | 4.14 | 18.1 | 0.92 | 78.9 | 37.0 | 1.73 | 12.2 | 94.9 | 85.3 | 49.5 |
| 24 | 200 | 0.5 | 80 | 4.0 | 20.0 | 1.36 | 87.5 | 36.3 | 1.63 | 12.9 | 93.4 | 79.7 | 44.2 |

TABLE 4

Dependence of pressure exchange upon quantity of concentrate

Input: Cu—Zn—Pb-concentrate

| | Cu | Zn | Fe | Pb | S |
|---|---|---|---|---|---|
| % | 16.4 | 10.0 | 25.3 | 6.3 | 35.2 |

Predominantly chloridic solution

| | Cu | Fe | Zn | $Cl^-$ | $SO_4^{2-}$ | $Na^+$ | |
|---|---|---|---|---|---|---|---|
| g/l | 18-25 | 1.5 | 39.5 | 95 | 145 | | cation equalization |

| | Conditions | | | Ratio g concentrate g Cu in solution | Starting Solution | | Final Solution | | Copper concentrate | | | | Cu-Precipitation (%) | Ag-Precipitation (%) | Zn yield (%) | Fe yield (%) |
|---|---|---|---|---|---|---|---|---|---|---|---|---|---|---|---|---|
| Test No. | Temp. (°C.) | Residence time h | Concentrate (g/l) | | Cu (g/l) | Ag (mg/l) | Cu (g/l) | Ag (mg/l) | Quantity (g/l) | Cu (%) | Zn (%) | Fe (%) | | | | |
| 25 | 200 | 3 | 44.6 | 1.72 | 25.9 | 39 | 8.8 | 44 | 48.9 | 42.1 | 0.20 | 10.1 | 66.0 | 0 | 97.8 | 56.1 |
| 26 | 200 | 3 | 50.0 | 2.72 | 18.4 | 44 | 2.37 | 44 | 57.4 | 42.0 | 0.24 | 10.4 | 87.1 | 0 | 97.2 | 52.6 |
| 27 | 200 | 3 | 60.0 | 3.26 | 18.4 | 44 | 0.82 | 10 | 62.3 | 44.5 | 0.32 | 11.1 | 95.5 | 77.3 | 96.7 | 54.3 |
| 28 | 200 | 3 | 70.0 | 3.80 | 18.4 | 44 | 0.089 | 3.7 | 68.3 | 44.2 | 0.68 | 11.1 | 99.5 | 91.6 | 93.4 | 57.0 |

TABLE 4-continued

Dependence of pressure exchange upon quantity of concentrate

| 29 | 200 | 3 | 100.0 | 5.43 | 18.4 | 44 | 0.0078 | 0.6 | 92.3 | 37.8 | 3.45 | 13.5 | >99.9 | 98.6 | 68.2 | 50.6 |
| 30 | 200 | 3 | 200.0 | 7.11 | 28.1 | 47 | <0.01 | <0.5 | 212.4 | 30.2 | 5.40 | 16.4 | >99.9 | >98.9 | 42.7 | 31.2 |

TABLE 5

Reduction of copper(II)-containing, predominantly chloridic solution with concentrates containing copper(I) sulphide Composition of the predominantly chloridic solution:

| Type A | $Cu^{2+}$ | Zn | Fe | $Cl^-$ | $SO_4^{2-}$ | $Na^+$ |
|---|---|---|---|---|---|---|
| | g/l 20.2 | 39.5 | 1.5 | 95 | 145 | cation equalization |
| Type B | $Cu^{2+}$ | $Fe^{2+}$ | $Cl^-$ | | | |
| | g/l 65.6 | 112.5 | 214 | | | |

| Test No. | Temp. (°C.) | Residence Time (h) | Chloridic solution Type | $Cu^{2+}$ conc. (g/l) | Copper(I)-sulphide Concentrate Weight (g/l) | Cu (%) | Stoichiometry based on $Cu^{2+}$ in solution (%) | Final Solution Cu (g/l) | Final Concentrate Weight (g/l) | Cu(%) | S(%) | $SO_4$-S(%) | Cu Yield (%) | Degree of reduction (%) |
|---|---|---|---|---|---|---|---|---|---|---|---|---|---|---|
| 31 | 90 | 0.42 | A | 20.2 | 57.6 | 70.12 | 100 | 34.1 | 41.3 | 62.2 | 22.1 | — | 36.3 | 69 |
| 32 | 90 | 0.42 | A | 20.2 | 86.4 | 70.12 | 150 | 39.6 | 61.9 | 61.5 | 23.4 | 4.3 | 37.2 | 96 |
| 33 | 90 | 0.42 | A | 20.2 | 115.2 | 70.12 | 200 | 42.2 | 91.1 | 62.3 | 22.4 | 2.8 | 29.7 | 100 |
| 34 | 90 | 1 | B | 63.6 | 184.0 | 70.75 | 100 | 104.7 | 138.9 | 58.4 | 25.0 | 1.4 | 37.7 | 64.6 |

TABLE 6

Behavior of lead present in the complex concentrate during pressure exchange and subsequent leaching with common salt

1 Pressure Exchange (Test 55)

| Conditions | Temperature | 200° C. |
|---|---|---|
| | Residence time | 1 hour |
| | Ratio of concentrate to copper | 4.14 g/g |
| Input | Concentration (g/l) | |

| | | Cu% | Zn% | Fe% | Pb% |
|---|---|---|---|---|---|
| Cu—Zn—Pb— Concentrate | 75 | 16.4 | 10.0 | 25.3 | 6.3 |
| Sulphur-containing predominantly chloridic solution | — | $Cu^{2+}$ 18.1 | $SO_4^{2-}$ 145 | $Cl^-$ 95 | g/l |

Output

| | | Cu% | Zn% | Fe% | Pb% |
|---|---|---|---|---|---|
| $PbSO_4$-containing Cu-concentrate | 81 | 38.4 | 1.43 | 11.3 | 5.9 |
| Solution freed from copper | — | $Cu^+$ 0.56 | g/l | | |

| Yield | | | |
|---|---|---|---|
| Cu-precipitation | Zn yield | Fe yield | Pb yield |
| 96.9 | 84.6 | 51.8 | 0% |

2 Lead leaching of the $PbSO_4$-containing copper concentrate in a common salt solution (test 36)

| Conditions: | Temperature | 80° C. |
|---|---|---|
| | Residence time | 0.5 hour |
| | pH | 2.0 |
| | NaCl concentration | 250 g/l |
| | Concentration of the $PbSO_4$-containing Cu-concentrate | 144.6 g/l |
| Cu-concentrate: | Concentration | 130.4 g/l |
| | Composition | Cu% Zn% Fe% Pb% |
| | | 42.6 1.59 12.5 0.04 |
| Pb-Yield | | 99% |

It will be appreciated that the instant specification and examples are set forth by way of illustration and not limitation, and that various modifications and changes may be made without departing from the spirit and scope of the present invention.

We claim:

1. A process for the production of a sulphidic copper concentrate from a complex sulphidic concentrate containing as its main constituents copper, iron and at least one non-ferrous metal selected from the group consisting of zinc, lead, nickel and cobalt, comprising treating at elevated temperature above about 180° C. and pressure at a pH-value of below 3 a mixture of a complex sulphidic concentrate and a copper-containing predominantly chloridic solution, thereby to produce a sulphidic copper concentrate, the ratio of grams of concentrate: grams Cu in solution being a maximum of the order of about 5:1.

2. A process as claimed in claim 1, wherein the copper-containing predominantly chloridic solution contains precious metals, and the precious metals are extracted with the accumulating copper concentrate.

3. A process as claimed in claim 1, wherein the ratio by weight of the complex concentrate added to the copper-containing predominantly chloridic solution to the copper content of the solution is such that the predominantly chloridic solution after being at least partly freed from copper by an exchange reaction has a potential at 60° C. of at least about 400 mV.

4. A process as claimed in claim 1, wherein copper in the chloride solution is present as copper (I), copper (II) or a mixture thereof and the copper (II) to copper (I) ratio in the copper-containing predominantly chloridic solution mixed with the complex sulphidic concentrate is such that virtually no acid is formed.

5. A process as claimed in claim 1, wherein the copper (II) to copper (I) ratio in the copper-containing predominantly chloridic solution is such that the copper present in the sulphidic copper concentrate produced is mainly in the form of copper (II) sulphide.

6. A process as claimed in claim 1, wherein the copper (II) to copper (I) ratio in the copper-containing predominantly chloridic solution is such that the copper present in the sulphidic copper concentrate produced is mainly in the form of copper (I) sulphide.

7. A process as claimed in claim 1, wherein the copper-containing predominantly chloridic solution is prepared by the oxididative leaching of copper-containing sulphidic concentrates in a chloridic solution.

8. A process as claimed in claim 1, wherein the solution of the suspension produced by the elevated temperature treatment contains zinc and copper (I) chloride, the solution being treated with a cation exchanger and with an oxygen-containing gas thereby to take up the zinc on the exchanger and to oxidize the copper (I) to copper (II).

9. A process as claimed in claim 1, wherein the solution of the suspension produced by the elevated temperature pressure treatment contains iron and copper (I) chloride, the solution being treated with oxygen thereby to oxidize the copper (I) to copper (II) and to oxidize the iron thereby to cause it to precipitate out.

* * * * *